ns
OR    3,989,355

United States
Wilmer    SUBSTITUTE FOR MISSING OR

[11] 3,989,355
[45] Nov. 2, 1976

[54] ELECTRO-OPTIC DISPLAY SYSTEM
[75] Inventor: Michael E. Wilmer, Portola Valley, Calif.
[73] Assignee: Xerox Corporation, Stamford, Conn.
[22] Filed: Jan. 21, 1975
[21] Appl. No.: 542,786

[52] U.S. Cl. .................... 350/160 LC; 340/324 M
[51] Int. Cl.² ........................................ G02F 1/16
[58] Field of Search .......... 350/160 LC; 340/324 M, 340/336

[56]    References Cited
UNITED STATES PATENTS

| | | | |
|---|---|---|---|
| 2,543,793 | 3/1951 | Marks | 350/150 X |
| 3,408,532 | 10/1968 | Hultberg et al. | 340/324 M |
| 3,622,224 | 11/1971 | Wysocki et al. | 350/160 LC X |
| 3,848,247 | 11/1974 | Sherr | 350/160 LC X |

*Primary Examiner*—John K. Corbin
*Assistant Examiner*—Rolf Hille
*Attorney, Agent, or Firm*—James J. Ralabate; Michael H. Shanahan; Max J. Kenemore

[57]    ABSTRACT

An electro-optic display having a plurality of sets of overlapping grid address layers, wherein each set of address layers comprises electrode means for allowing transmission of light through only one half of the total area of the display, and successive sets of layers have increased numbers of individual electrodes which comprise each layer, the number of individual electrodes increasing in the progression $2^n$ where n is the number of sets of overlapping grid layers, and the alternate individual electrodes on any one layer, which comprise one half of the total area of the display, are commonly connected for attachment to a source of electrical potential, and the other alternate electrodes, which comprise the other half of the total area of the display, are commonly connected for attachment to a source of electrical potential, so that any one of $(2^n)^2$ bits of the total display area may be selectively addressed by selectively operating one of the commonly connected alternate electrodes of each pair of address grids.

12 Claims, 12 Drawing Figures

ELECTRO-OPTIC DISPLAY SYSTEM

This invention relates to electro-optic display systems, and more specifically to methods and apparatus for addressing various specific bits of the total area of such electro-optic displays. Furthermore, this invention is related to such systems for addressing electro-optic cells wherein liquid crystal materials, or other electro-optic materials, are the active ingredients in the electro-optic cell.

A variety of display cells are known wherein materials whose optical properties change with differing electrical environments are used as the active imaging material. Such materials are known as electro-optic materials, and such devices are generally known as electro-optic cells. One class of materials which has recently come into general use in such cells are known as "liquid crystals". Liquid crystal substances exhibit physical characteristics some of which are typically associated with liquids and others which are typically unique to solid crystals. Liquid crystals are known to appear in three different forms: the smectic, nematic, and cholesteric forms. These structural forms are sometimes referred to as mesophases, thereby indicating they are states of matter intermediate between the liquid and crystalline states. The three mesophase forms of liquid crystals mentioned above are characterized by different structures wherein the molecules of a volume of the compound are arranged in a structure which is unique to each of the three mesomorphic states. Each of these structures is well known in the liquid crystal art.

Cholesteric liquid crystals are known to have certain unique responses to electrical fields, as disclosed, for example, in Wysocki et al U.S. Pat. No. 3,652,148; Wysocki et al U.S. Pat. No. 3,642,348; and Haas et al U.S. Pat. No. 3,680,950. Cholesteric liquid crystals or compositions exhibiting cholesteric liquid crystal characteristics are typically translucent, for example like a milky white, opalescent material in one of their natural optical states. This state is also known as the focal-conic or "undisturbed" state of cholesteric liquid crystal materials. U.S. Pat. No. 3,652,148 describes a system wherein compositions exhibiting cholesteric liquid crystal characteristics are placed in high strength electrical fields to cause an electrical-field induced phase transition to occur wherein optically negative cholesteric liquid crystal compositions are transformed into a transparent optically positive liquid crystal state, which is believed to structurally resemble the nematic liquid crystal mesophase structure.

Nematic liquid crystals are also known to be responsive to electrical fields and currents, and have been used in various electro-optic cells and imaging systems, for example as disclosed in Williams U.S. Pat. No. 3,322,485, Heilmeier et al, U.S. Pat. No. 3,499,112; and Haas U.S. Pat. No. 3,806,230. Many of the known nematic liquid crystal light valves and display devices make use of the dynamic light scattering characteristics of layers of nematic liquid crystal materials which have electrical fields placed across the thickness of the layer. See Heilmeier et al., "Dynamic Scattering: A New Electro-Optic Effect in Certain Classes of Nematic Liquid Crystals" Proc. I.E.E.E., Vol. 56, No. 7, July 1968, pp. 1162–1171. The dynamic light scattering is believed to be due to the differential alignment of domains or swarms of birefringent liquid crystal molecules in the electric field affected areas in such systems. Mixtures of cholesteric and nematic liquid crystals have also shown responses to electrical fields, as shown for example in Heilmeier, G.H. and Goldmacher, J.E., Appl. Phys. Letters Vol. 13, No. 4, p. 132 (1968), and Soref, R.A., "Thermo-Optic Effects in Nematic-Cholesteric Mixtures," J. Applied Physics, Vol. 41, No. 7, June, 1970, pp. 3021–3026, which disclose optical changes of induced states in nematic-cholesteric mixtures, and in Haas, W., Adams, J., and Flannery, J.B., "ac-Field-Induced Grandjean Plane Texture in Mixtures of Room-Temperature Nematics and Cholesterics" Phys. Rev. Letters, Vol. 24, No. 11, p. 511 (c), (1970), which discloses that certain mixtures of cholesteric and nematic liquid crystals exhibit dynamic scattering in response to an electrical field.

In addition to the aforementioned liquid crystal materials, other electro-optic cells make use of other electro-optically active materials. For example, other suitable electro-optic materials include mixtures of fine metallic particles such as aluminum in insulating oils; suspensions of opaque plate-like particles such as graphite in oil; and various other materials as disclosed in Donal, Proc. I.R.E., May, 1943, p. 208; and in Marks U.S. Pat. No. 2,543,793.

The electro-optic display cells of the prior art have been used in a variety of combinations, and addressed in a number of different ways. For example, Castellano U.S. Pat. No. 3,703,329 shows a color display system wherein a plurality of liquid crystal cells are stacked one behind the other. Ngo U.S. Pat. No. 3,645,406, and Matthies U.S. Pat. No. 3,661,444, as well as Cole, Skelly, Stein, and Reiche, "A Three-Dimensional Display for Radar Returns," Symp. Dig. of Tech Papers, Soc. for Info. Display, 1974 Meeting, May 21–23, 1974, San Diego, Calif., Vol. V, pp. 52–53, Lewis Winner pub., New York, all show liquid crystal display systems including stacks of crossed grids of electrodes for addressing the various layers of the displays. Wysocki et al U.S. Pat. 3,622,224, shows a display device comprising serially stacked alpha-numeric liquid crystal cells. In the field of electron beam display technology, Jeffries, Landrum, and North, "New Technology For the Display of Digitally Generated Information, " Proc. First European Electro-Optics Markets and Tech. Conf., Geneva, September, 1972, pp. 341–347, describe a cathode-ray system including an inherent binary addressing feature.

However, in new and growing areas of technology, such as electro-optic display systems, new methods, apparatus, compositions, and articles of manufacture continue to be discovered for the application of the new technology in new modes. For example, the present invention provides a system for addressing any desired bit of the total area of an electro-optic display, which system minimizes the number of sources of electrical potential necessary to operate the display as a whole.

BRIEF SUMMARY OF THE INVENTION

It is, therefore, an object of this invention to provide a novel electro-optic address system.

It is another object of this invention to provide a novel system for addressing a multi-planar electro-optic display system.

It is another object of this invention to provide a multi-planar electro-optic display system having an address system of greater simplicity than former systems.

The foregoing objects and others are achieved in the present invention by providing an electro-optic display having a plurality of sets of overlapping grid address layers, wherein each set of address layers comprises electrode means for allowing transmission of light through only one half of the total area of the cell, and successive sets of layers have increased numbers of individual electrodes which comprise each layer, the number of individual electrodes increasing in the progression $2^n$ where $n$ in the number of sets of overlapping grid layers, and the alternate individual electrodes on any one layer, which comprise one half of the total area of the display, are commonly connected for attachment to a source of electrical potential, and the other alternate electrodes, which comprise the other half of the total area of the display, are commonly connected for attachment to a source of electrical potential, so that any one of $(2^n)^2$ bits of the total display area may be selectively addressed by selectively operating one of the commonly connected alternate electrodes of each pair of address grids. This system provides a means for addressing a spatially orthogonal group of electrically switchable grid layers to individually address any one of $(2^n)^2$ bits in a display of $n$ sets of such overlapping grid layers using only about $2n$ different voltage drivers or switch positions.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DETAILED DESCRIPTION OF THE PREFERRED EMBODIMENTS

Figure 1:
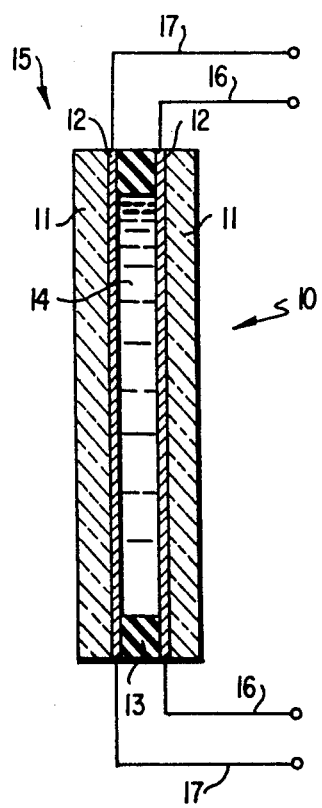
FIG. 1 is a partially schematic, cross-sectional view of a single electro-optic cell.

FIG. 1 illustrates a typical single electro-optic cell 10, sometimes referred to as an electroded sandwich cell, wherein a pair of transparent plates 11, having substantially transparent conductive coatings 12 upon the contact surfaces thereof, comprise substantially parallel pairs of transparent electrodes. Cells wherein both electrodes are substantially transparent are preferred where the display is to be viewed in transmitted light. The transparent electrodes are separated by spacing-gasket member 13 which includes voids which form one or more shallow cups which contain the active electro-optic material in a film or layer. An electrical field is created between the electrodes by external circuitry 15 which typically comprises a source of electrical potential connected across portions of the two electrodes, which portions are connected to leads 16, and 17, respectively. External circuitry 15 may also contain suitable switching means as desired.

In the electro-optic cells described herein the electrodes may comprise any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings may be evaporated or otherwise applied onto the transparent substrated NESA glass, a tin oxide coating glass manufactured by the Pittsburgh Plate Glass Company, is a commercially available example of a typical transparent, conductive electrode material. Where more than one individual electrode is in the form of a grid of strips or other geometric configurations are coplanar on the same substrate, they may be insulated from each other by physically spacing as manufactured, or by etching, abrading or otherwise removing the conductive material between the individual electrodes, or another insulating material may separate the individual electrodes.

The spacer 13 which separates the transparent electrodes and contains the active electro optic material between said electrodes, is typically chemically, inert, substantially insulating, may or may not be transparent, and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof. The spacers may be glued or otherwise sealed to the electrode plates.

Such spacers, also approximately define the thickness of the layer of active electro-optic material and are preferably of a thickness in the range of about 10 mils or less. Optimum results are typically attained with spacers in the thickness range between about ¼ mil and about 5 mils.

The layer or film of active electro-optic material 14 may, in various embodiments of the present invention, comprise liquid crystal materials, optically active materials, or other suitable electro-optic compositions such as mixtures of particles in a liquid carrier.

A variety of liquid crystal materials may be suitable for use in the electro-optic displays of the present invention. For example, cholesteric liquid crystals suitable for use in the present invention include derivatives from reactions of cholesterol and inorganic acids; such as, cholesteryl chloride, cholesteryl bromide, cholesteryl iodide, cholesteryl fluoride, cholesteryl nitrate; esters derived from reactions of cholesteryl and carboxylic acids; for example, cholesteryl crotonate; cholesteryl nonanoate, cholesteryl hexanoate; cholesteryl formate; cholesteryl chloroformate; cholesteryl propionate; cholesteryl acetate; cholesteryl linoleate; cholesteryl linolenate; cholesteryl oleate; cholesteryl erucate; cholesteryl butyrate; cholesteryl caprate; cholesteryl laurate; cholesteryl myristate; ethers of cholesteryl such as cholesteryl decyl ether; cholesteryl lauryl ether, cholesteryl oleyl ether; cholesteryl dodecyl ether; carbamates and carbonates of cholesterol such as cholesteryl oleyl carbonate; cholesteryl ethyl carbonate; cholesteryl butyl carbonate; cholesteryl geranyl carbonate; cholesteryl erucate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl 1-2-(2-methoxyethoxy) ethyl carbonate; cholesteryl heptyl carbamate; peptides such as poly γ -benzyl- φ -glutamate derivatives of beta sitosterol such as sitosteryl chloride; and active amyl ester of cyanobenzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Mixtures of such materials and others may also be used.

Nematic liquid crystal materials suitable for use in the present invention include: p-azoxyanisole, p-azoxyphenetole, p-butoxybenzoic acid, p-methoxy-cinnamic acid, butyl-p-anisylidene-p-aminocinnamate, anisylidene para-amino-phenylacetate p-ethoxy-benzalamino-a-methyl-cinnamic acid, 1,4-bis (p-ethoxy benzylindene) cyclo-hexanone, 4,4'-dihexyloxybenzene, 4,4'-diheptyloxybenzene, anisal-p-amino-azobenzene, anisaldazine, n,n'-nonoxybenze-toluidine; anils of the generic group (p-n-alkoxy-benzylidene-p-n-alkylanilines), such as p-methoxy benzylidene p-n-butylaniline, and p-ethoxy benzylidene p'-n-butylaniline; chlorostilbenes, mixtures of the above and many others.

Smectic liquid crystal materials are also suitable for use in the present invention and such smectic materials include: n-propyl-4'-ethoxy biphenyl-4-carboxylate; 5-chloro-6-n-heptyloxy-2-naphthoic acid at temperatures in the range of about 166°–176°C.; lower temperature mesophases of cholesteryl octanoate, cholesteryl nonanoate, and other open-chain aliphatic esters of cholesterol with chain length of 7 or greater; cholesteryl oleate; sitosteryl oleate; 4'-n-alkoxy-3'-nitrobiphenyl-4-carboxylic acids; ethyl-p-azoxycinnamate; ethyl-p-4-ethoxybenzylideneaminocinnamate; ethyl-p-azoxybenzoate; potassium oleate, ammonium oleate; p-n-octylloxybenzoic aid; the low temperature mesophase of 2-p-n-alkoxy-benzylideneaminofluroenones with chain length of 7 or greater; the low temperature mesophase of p-(n-heptyl) oxybenzoic acid; anydrous sodium stearate; thallium (1) steatate; mixtures thereof and others.

In addition, to the materials listed above various mixtures of electro-optic materials may be used in the present invention. For example, mixtures of liquid crystal materials, mixtures of cholesteric and nematic liquid crystals, mixtures of liquid crystals and various dyes, mixtures of liquid crystal and emulsifying agents such as Fluorolube, polymers of trifluorovinyl chloride available from the Hooker Chemical Corp., Niagara Falls, N.Y., and dimethyl formamide. Also, racemic mixture of cholesteric liquid crystals, where the mixture comprises equal strength of right and left-hand optical rotary compounds, are suitable for use in the present invention. Mixtures of liquid crystals can be prepared in organic solvents such as chloroform, petroleum ether, methylethyl ketone and others, which are typically subsequently evaporated from the mixture thereby leaving the liquid crystalline mixture in a desired location. Alternatively, the individual liquid crystals of the mixture can be combined directly by heating the mixed components above the isotropic transition temperature. Such solutions or melts of liquid crystals are particularly suitable for use in providing layers of liquid crystals on surfaces.

Others optically active, non-mesomorphic materials may be used in the present invention includes: derivatives of alcohols such as 1-menthol, 1-linanool, d-mannitol, d-borneol and d-quercitol; derivates of ketones such as d-camphor, d-3-methylcyclohexanone 1-methone and 1-6-isopropyl-3-cyclohexanone; derivatives of carboxylic acids such as d-citronellic acid, 1-citronellic acid, d-chaulmoogric acid, 1-campholic acid, 1-arabonic acid, d-tartaric acid and 1-ascorbic acid, derivaties of aldehydes such as d-citronellal; derivatives of alkenes such as 1-B-pinane, d-silvesterene, and d-limonene; derivatives of amines such as 1-2-methylpiperidine; derivatives of nitriles such as d-mandelonitrile; derivatives of amides such as d-dydrocarbamide; and mixtures thereof.

Other suitable electro-optic materials include mixtures of fine metallic particles such as aluminum in insulating oils, suspensions of opaque plate-like particles such as graphite in oil; and various other materials as disclosed in Donal, Proc. I.R.E., May, 1943, p. 208; and in Marks U.S. Pat. No. 2,543,793.

The above list of materials are not intended to be exhaustive or limiting. The lists disclose a variety of representative materials suitable for use in the electro-optic composition or mixture which comprises the active element in the advantageous system of the present invention.

Figure 2:
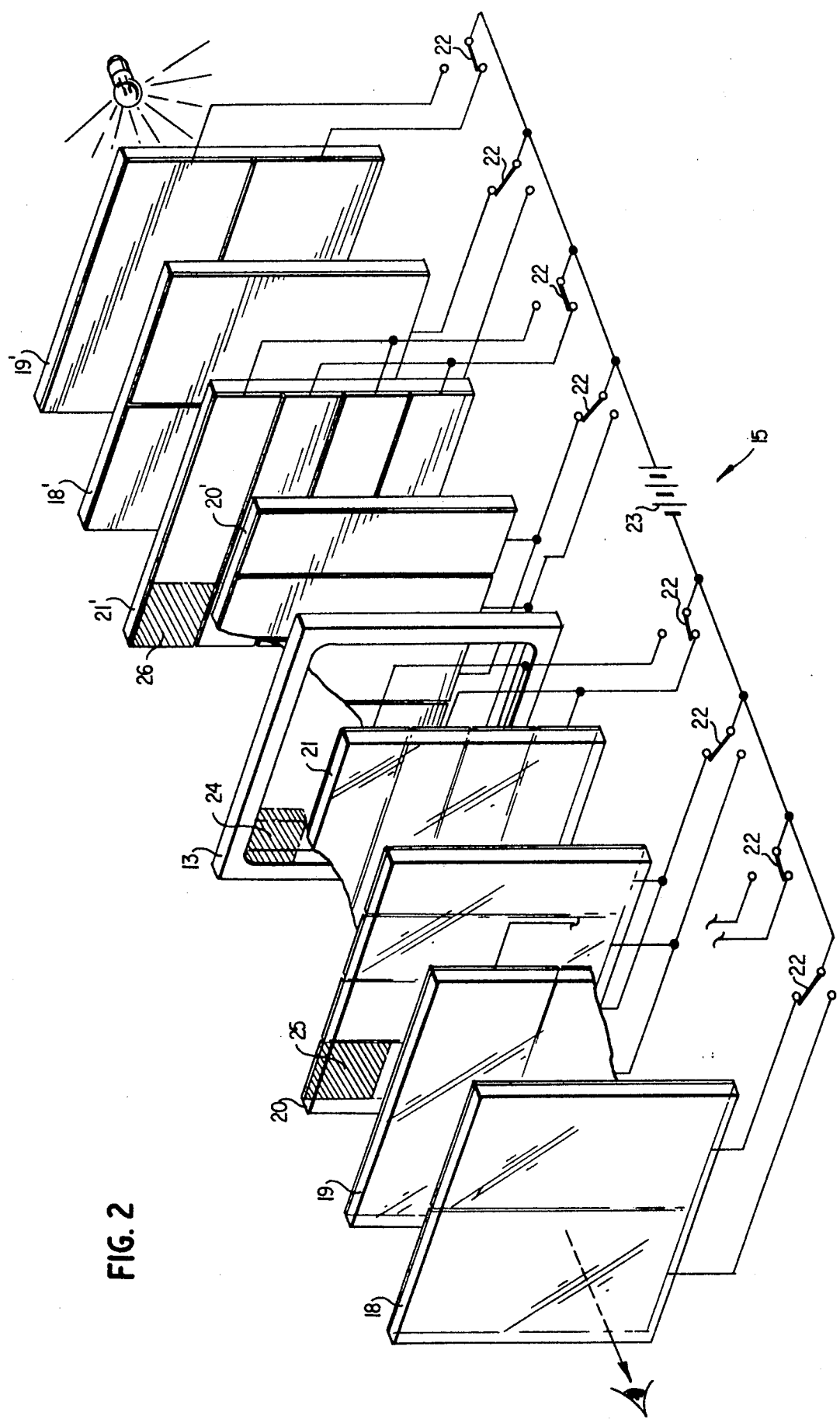
FIG. 2 is a partially schematic, exploded isometric view of the present invention wherein a single electro-optic cell is addressed by a plurality of pairs of crossed-grid address electrode layers.

A preferred embodiments of the address system of the present invention is schematically illustrated in exploded isometric form in FIG. 2. In that embodiment a single layer of active electro-optic material is enclosed within spacer-gasket 13 which is at the center of a plurality of pairs of grid address electrode layers. one such pair of those grid electrode layers 18 and 18' have the total electrode area divided into two electrode strips of equal size. The electrode strips on grids 18 and 18' run vertically. The electrode strips on the corresponding pair of grids 19–19' run horizontally. Another set of grid electroded address layers 20 and 20' are also illustrated in FIG. 2, and the area of these grid layers, which corresponds to the total area of the electro-optic display of FIG. 2, is divided into four electrode strips of equal area. The electrode strips on grids 20 and 20' run vertically, and those of corresponding grids 21 and 21' run horizontally. While only two sets of crossed-grid electrode address layers 18–18', 19–19' and 20–20', 21–21' are illustrated in FIG. 2, it will be appreciated that additional sets of crossed-grid electrode address layers may be used in such embodiments of the invention is exactly the same way in which the illustrated sets are used.

It is also noted that a number of electrode strips into which the total area of an electrode address layer is divided, is significant in the present invention. As shown in FIG. 2, the first set of cross-grid electrode address layers 18–18'; and 19–19' are each divided into two electrode strips. Then the second set of crossed-grid electrode layers 20–20' and 21–21' are each divided into four electrode strips. Similarly, the number of electrode strips on the electrode address layers of any crossed set in the system of the present invention should be equal to $2^n$, where $n$ is the number of the set of crossed-grid layers counted from the set like 18–18', 19–19' shown in FIG. 2, where each layer is divided into two electrode strips. Hence it is seen that the number of electrode strips on address layers in succeeding crossed sets follows the progression 2, 4, 8, 16, 32, 64, 128, . . . This system provides a means for addressing any one of $(2^n)^2$ bits of the total display area.

The individual electrode strips on the electrode grid layers are electrically connected to create electrical fields across desired areas of the layer of electro-optic material enclosed within the gasket 13. The electrical circuitry by which the electrodes are connected to create such fields includes commonly connecting alternate individual electrodes on any one grid layer, which alternate electrodes comprise one half of the total area of the display, so that all of those alternate electrodes may simultaneously be connected to a source of electrical potential. Similarly, the other alternate electrodes on the same grid, which also comprise the other half of the total area of the display, are commonly connected so that they too may be simultaneously attached to a source of electrical potential. This is illustrated in FIG. 2 by external circuitry 15 which shows that each of the individual electrode strips on the grids 18 and 18' is connected to a separate lead. The common connection of alternate electrode strips to each other is better illustrated with respect to grids 20 and 20', where it is seen that alternate electrode strips are commonly connected to the same external lead. The external circuitry 15 in FIG. 2 also includes switches 22 by which either set of the electrode strips, or all of the electrode strips in a given grid may be electrically connected to one side of a source of potential 23.

The switches 22 in FIG. 2 are illustrated connecting various sets of alternate electrodes in order to create an electrical field across the entire area of the display cell, that area being commensurate with the area enclosed by the gasket 13, except that the upper left hand corner bit 24 does not have an electrical field created across it, because neither one of the electrode strips 25 or 26, which cross to define the area of bit 24, are connected when the switches 22 are in the position shown. Hence the electro-optic material in the area 24 is unaffected by an electrical field, while the electro-optic material in the remainder of the display cell area is affected by the application of an electrical field, thereby changing it optical characteristics so that the optical characteristics of the bit 24 are distinguishable from the remainder of the area of the display.

In the same way, the switches 22 in FIG. 2 may be set in a variety of combinations in order to selectively isolate any one of $(2^n)^2$ bits, which in the case shown in FIG. 2 is any one of 16 separate bits of the total area of the display. It is therefore clear that the present system provides a means for addressing a spatially orthogonal group of electrically switchable grid layers to individually address any one of $(2^n)^2$ bits in a display of $n$ sets of such overlapping grid layers using not more than about $2n$ different voltage drivers or switch positions.

The address system of the present invention is particularly suitable for use in displays making use of the electro-optic effect described in U.S. Pat. No. 3,652,148, the entire disclosure of which is hereby expressly incorporated by reference in the present specification. In the system described in that patent, a mixture or composition which exhibits cholesteric liquid crystal characteristic is used in an electrode sandwich configuration such as that described in FIG. 1, so that high strength electrical fields across the liquid crystal composition film cause an electrical field-induced phase transition to occur wherein the optically negative cholesteric liquid crystal composition is transformed into an optically positive liquid crystal state. The electro-optic cholesteric liquid crystal or optically active composition has a transition threshold field strength at or above which the transition takes place. This transition is believed to be the result of the cholesteric liquid crystal transforming into the nematic liquid crystal mesophase structure. This is believed to be a bulk effect which affects the entire cross-section of the transformed portions of the composition layer. In those areas of the total electro-optic liquid crystal layer which are not electrical field affected, the electro-optic material maintains the milky white, opalescent appearance of its natural optical state. However, where the electrical field-induced transition has taken place, the electro-optic material is transformed into an induced transparent nematic state, which is a system like that illustrated in FIG. 2 of the present application would provide a selective bit lighted in the milky white translucent state on a transparent background. It will of course be appreciated that this is only one exemplary application of the address system of the present invention, and that the use of the other electro-optic material as the active material therein may provide various systems of light-on-dark, dark-on-light, or even multi-color displays.

Figure 3A:
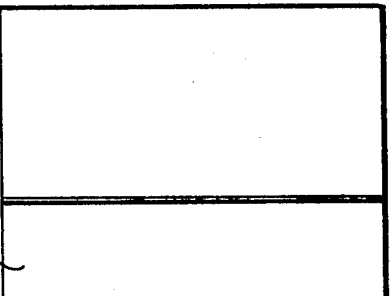
FIGS. 3A–3H show the address electrodes on those layers and their relative orientations to each other.
Figure 3B:
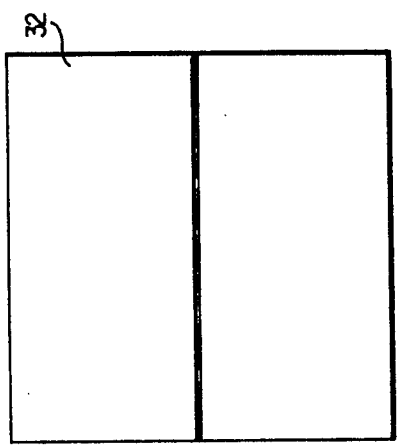
Figure 3C:
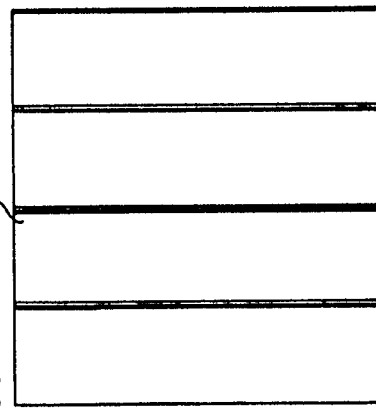
Figure 3D:
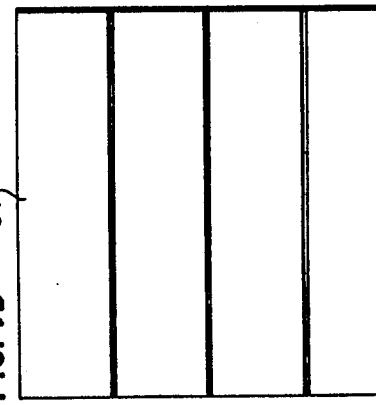
Figure 3E:
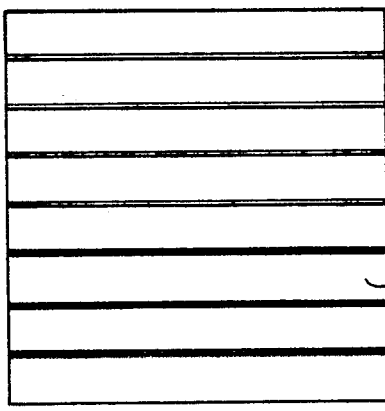
Figure 3F:
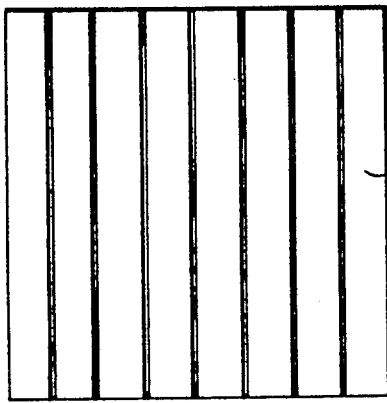
Figure 3G:
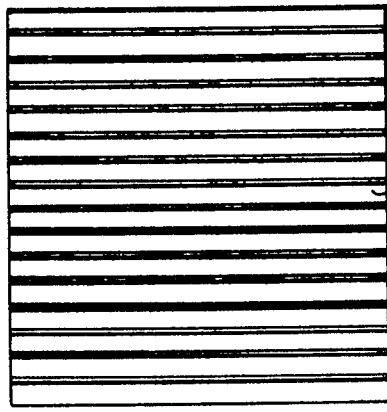
Figure 3H:
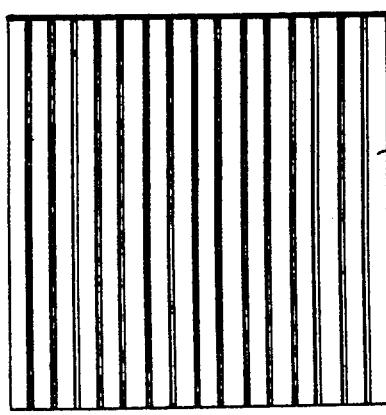
Figure 3:
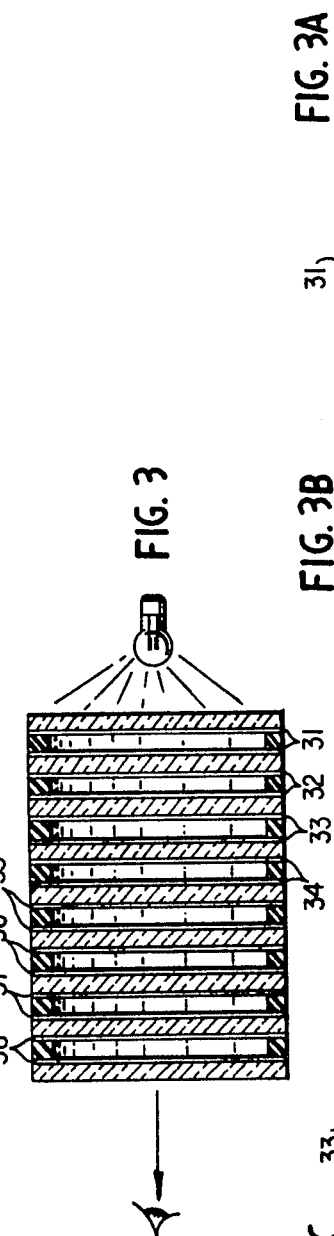
FIG. 3 is a partially schematic cross-sectional view of the present invention wherein each cell of a set of serially stacked cells is provided with a pair of crossed-grid electrode layers.

Another embodiment of the advantageous address system of the present invention is illustrated in FIG. 3, and in FIGS. 3A–3H. In this embodiment, a plurality of individual electro-optic cells containing an electro-optic material 14 are shown serially stacked one behind the other in a system which is again capable of selectively addressing any one of $(2^n)^2$ bits of the total display area where $n$ is the number of sets of cross-grid layers being used. As illustrated in FIG. 3A a first pair of electrode grids 31 have the total area divided into two electrode strips of equal area, which electrode strips extend vertically. Stacked contiguous the cell sandwiched by pair of grids 31 is a similar cell sandwiched by pair of grids 32 shown in FIG. 3B which again have two electrode strips equally dividing the area of the layers, with electrode strips extending horizontally. The cells sandwiched by the grids 31 and 32 form a first set of crossed-grid electrodes which correspond to the condition $n=1$. Then stacked contiguous the cell sandwiched by grids 32, is a similar cell sandwiched by grids 33 shown in FIG. 3C wherein the area of the layer is divided into four electrode strips of equal area, those electrode strips extending vertically. That cell is contiguous a similar cell sandwiched by a pair of grids 34 shown in FIG. 3D, each of which is equally divided into four electrode strips which strips extend horizontally. The cells sandwiched by the pairs of grids 33 and 34, form a second set of crossed-grid electrode layers which correspond to the condition $n=2$.

Similarly, another cell is contiguous the cell sandwiched by the grids 34, and that cell is itself sandwiched by grids 35 shown in FIG. 3E wherein the total area is divided into eight electrode strips of equal area, with those electrode strips extending vertically. Contiguous that cell is another similar cell sandwiched by grids 36 shown in FIG. 3F wherein the total area is again divided into eight equal electrode strips, which extend horizontally. The cells sandwiched by the grids 35 and 36 form a third set of crossed-grid address layers corresponding to the condition $n=3$. Still further, another cell is contiguous that sandwiched by the grids 36, that cell being sandwiched by grids 37 shown in FIG. 3G each of which is divided into sixteen equal electrode strips which extend vertically. And finally, that cell is contiguous another cell which is sandwiched by grids 38 shown in FIG. 34, each of which is divided into sixteen equal electrode strips which extend horizontally. The cells sandwiched by the grids 37 and 38 form a fourth set of crossed-grid address layers, corresponding to the condition $n=4$. The increasing numbers of electrode strips on the grids illustrated in FIGS. 3A through 3H even more clearly demonstrate the progression of the number of electrode strips on successive electrode address layers, which in any crossed set should be equal to $2^n$ where $n$ is the number of the set of crossed-grid layers in the system. As seen in FIG. 3A-3H, the progression increases 2, 4, 8, 16, according to the foregoing formula.

While for purposes of clarity and illustration, the electrical circuitry has been omitted from FIG. 3, it will be appreciated that each of the layers of grid electrodes in the system illustrated in FIG. 3 may be electrically connected by circuitry similar to that illustrated in FIG. 2, and that the switches in the system may be set in a variety of combinations for thereby selectively isolating one bit of the total cell area which will have a different appearance when the display is observed while being addressed by the advantageous system of the present invention. Since the fourth set of crossed-grid address layers in the system of FIG. 3 has sixteen individual electrodes therein, such a display provides 256 separate bits which may be addressed by the advantageous system of the present invention.

While the circuitry shown in FIG. 2 includes a single source of electrical potential 23, and a plurality of switches 22, at least one of which controls the application of the electrical potential to each one of the electrode grids in the system, other forms of electrical circuitry may be used in conjunction with the address system of the present invention. For example, instead of using a single source of electrical potential 23 for the entire system, each set of crossed-grid electrodes, for example like set 21–21' shown in FIG. 2, may be provided with a separate source of electrical potential, as well as the appropriate switching system. Furthermore, where such separate sources of electrical potential are used, such sources may have different potential values, thereby providing an additional an additional degree of freedom in the system which may be used to provide gray scale in images produced in the display where the electro-optic material used therein is differentially affected by electrical fields of different strengths. Another way to accomplish this result is to use a single source of electrical potential like the source 23 shown in FIG. 2, but to include various amounts of resistance in the circuitry connected to the individual electrode grids, thereby varying the field strengths produced by the different sets of crossed-grid electrodes.

Figure 4:
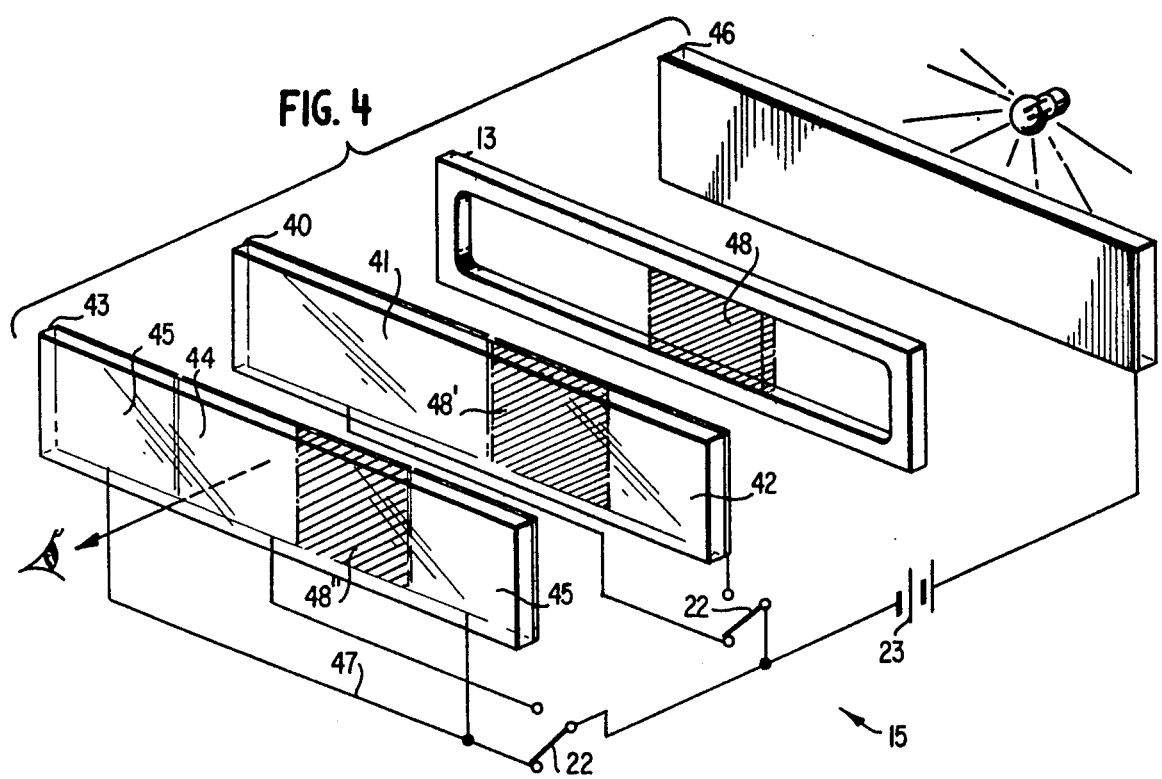
FIG. 4 is a partially schematic exploded isometric view of another embodiment of the present invention.

Still another embodiment of the system of the present invention is shown in partially schematic, exploded isometric form in FIG. 4. In the embodiment illustrated there, a single cell enclosed by spacer gasket 13 is addressed by a series of electrode grids. But rather than being in matching sets of crossed-grids, the electrodes are arranged in other sets, wherein each set comprises at least a pair of grids, each of which has the total surface area thereof divided in a different manner, but still into the same number of equal area units. This is illustrated in FIG. 4 where a first grid 40 is shown divided into two equal electrodes areas 41 and 42, while the other grid 43 of this set is divided into two equal areas 44 and 45, the area of electrode portion 45 being split into two smaller portions by the area of the electrode 44 which is situated therebetween. However, the total area of each one of the electrodes 41, 42, 44, and 45, is substantially equal. While there could be grids corresponding to grids 40 and 43 located on the opposite side of gasket 13, similar to the prime numeraled grids illustrated in FIG. 2, in the embodiment shown in FIG. 4, the system is somewhat simplified by using an overall area electrode 46 on the back side of spacer gasket 13, and that overall electrode operates in conjunction with any portions of the grids 40 and 43, which may be activated by the electrical circuitry connected thereto. The electrical circuitry 15 in FIG. 4 again includes a single source of potential 23, as well as conductors for commonly connecting alternate individual electrodes on any one grid which alternate electrodes comprise one half of the total area of the display. For example the common connection of the portions of electrode 45 is shown in conductor 47. As in the system shown in FIG. 2, each one of the grids 40 and 43 is provided with electrical conductors and a switching system 22, for selectively activating any one group of the commonly connected individual electrodes on a grid which comprise one half of the total area of the display. Of course the overall rear electrode 46 may always be connected to the source of electrical potential 23, regardless of the particular combination of electrodes selected in the grids 40 and 43. For example, the system shown in FIG. 4 shows electrode 41 on grid 40, and electrode 45 on grid 43, being activated, thereby creating an electrical field across the area of the cell defined by the spacer gasket 13, with the exception of the area 48, because neither electrode 42 of grid 40, nor electrode 44 of grid 43, the only electrodes on the front side of the spacer gasket 13 which could operate to provide an electrical field across the area 48, are electrically connected in the circuitry as illustrated in FIG. 4. The overlapping area of those electrodes 42 and 44, which overlap in the area corresponding to the area 48, are indicated by the shading in area 48' and 48", respectively. It is therefore clear that the grids of electrodes in the advantageous address system of the present invention need not be in a single X–Y pattern, but that they may take any form so long as each set of electrodes is comprised of two grids wherein the individual electrodes in each grid are in some way alternately and commonly connected so that each commonly connected set of alternate electrodes comprises one half of the total area of the display, and that the different grids in each set are oriented with respect to each other in a way so that their commonly connected groups of alternate electrodes respectively control different areas of the cell which overlap each other.

While the displays of the present invention may typically be viewed without image enhancing devices, in various embodiments it may be desirable to use polarizers, crossed polizers, optical filters, edge lighting systems or any other suitable means to enhance the quality of the desired image. Such devices may contribute to the formation of dark-on-light, light-on-dark, colored images using the inventive display system.

The following examples further specifically disclose the present invention with respect to novel systems for addressing electro-optic displays. The parts and percentages are given by weight unless otherwise indicated. The examples below are intended to illustrate various preferred embodiments of the novel electro-optic display system.

EXAMPLE I

An electro-optic cell with an address system similar to that illustrated in FIG. 2 is prepared by providing a series of tin oxide coated substantially transparent electrodes of NESA glass available from the Pittsburgh Plate Glass Co., on which the individual electrodes have been separated by etching away the tin oxide coating therebetween. An electro-optic material is prepared by mixing liquid crystal materials comprising about 30% cholesteryl chloride, about 56% cholesteryl nonanoate, and about 14% cholesteryl oleyl carbonate. A spacer gasket of about 1 mil thick Mylar, a polyethylene terethalate polyester available from duPont, having a square hole cut therein, is placed on the face of an electrode corresponding to grid 20' shown in FIG. 2, and the electro-optic material mixture is placed within the gasket, whereupon an electrode plate corresponding to grid 21 in FIG. 2 is placed on the opposite surface thereof. It is sometimes preferable to electrically connect the individual electrodes of each grid before stacking them together. The remaining electrodes are stacked in contact with one another in series and in the orientations shown in FIG. 2. The external circuitry is connected across a voltage source of strength sufficient to provide electrical fields of strength of about $10^5$ volts per centimeter across the thickness of the electro-optic layer when electrodes on opposite sides of the layer are activated by appropriate selection of positions of the various switches 22. The switches 22 may be positioned as desired, and in those portions of the electro-optic layer which are subject to an electrical field, the liquid crystal layer assumes a colorless, transparent appearance, while those portions of the layer not affected by the presence of an electrical field retain their milky white natural appearance.

EXAMPLE II

An electro-optic display is prepared by providing a series of grids as illustrated in FIG. 3, using the materials and methods described in Example I. The individual cells in the serially stacked system of FIG. 3 are each prepared using the same type of spacer gasket, and the same electro-optic material mixture as in Example I, and the individual cells are serially stacked in the order and orientation illustrated in FIG. 3. Each of the electrodes is connected to external circuitry similar to that shown in FIG. 2, except that additional conductors and switching systems are required for each of the cells whose grids have 8 and 16 electrodes strips, respectively. The switches are set in the desired combination, and whereever and electrical field of strength of about $10^5$ volts per centimeter is present across each of the cells of liquid crystal electro-optic material throughout the length of the stack series of cells, the display assumes a colorless transparent appearance, while at any portion of any cell which is not affected by such an electrical field, the liquid crystal electro-optic material therein retains its milky white natural appearance.

Although specific components, proportions and arrangements of elements have been stated in the above description of preferred embodiments of this invention, other equivalent components and arrangements of elements may be used with satisfactory results and various degree of quality, or other modifications may be made herein to synergize or enhance the construction of the invention to thereby increase its utility. It will be understood that such changes of details, materials, arrangements of parts, and uses of the invention described and illustrated herein, are intended to be included within the principles and scope of the claimed invention.

What is claimed is:

1. An electro-optic display comprising:
   a. at least one layer of electro-optic material;
   b. an addressing means for controlling the transmission of electromagnetic radiation through portions of said layer comprising a plurality of overlapping sets of address electrode plates electrically insulated from each other, one plate of each of said sets disposed on either side of said layer, at least one plate of each of said sets comprising individual electrodes, alternate individual electrodes in each such plate comprising substantially half of the total display area of said layer and being commonly coupled to a field creating means and the other alternate electrodes comprising substantially the other half of the total display area of said layer, said other alternate electrodes being commonly coupled to a field creating means, the electrodes in plates of one set overlying portions of electrodes in plates of other sets so that the overlying portions define bits of the layer; and
   c. a switch means for applying an electrical field across said layer between selected electrodes.

2. The display of claim 1 wherein the sets of plates share a common member on one side of the layer.

3. The display of claim 1 wherein both plates of each set of plates comprise alternate individual electrodes which are substantially similarly coupled and oriented in space.

4. The display of claim 1 wherein the individual alternate electrodes in a first set of plates are oriented at right angles to the individual alternate electrodes of a second set of plates having the same number of individual alternate electrodes.

5. The display of claim 4 wherein there are $2^n$ individual electrodes in at least one of the plates of each of said first and second sets of plates where n is the number of pairs of said first and second sets of plates.

6. The display of claim 1 additionally comprising multiple layers of electro-optical material, each of said multiple layers being between at least one of said sets of plates.

7. The display of claim 1 wherein the electro-optic material includes a liquid crystal material.

8. The electro-optic display of claim 1, wherein said means for applying an electrical field includes means for selectively connecting any combination of commonly connected alternate electrodes for thereby selectively creating an electrical field across the entire display area except a desired isolated bit corresponding to the overlapping area of two electrodes on different sets of plates.

9. The electro-optic display of claim 1, wherein said means for applying an electrical field includes a source of electrical potential.

10. The electro-optic display of claim 1 additionally comprising means for applying electrical fields of different field strengths across desired portions of the area of a layer of electro-optic material.

11. The electro-optic display of claim 1, wherein the electro-optic material comprises liquid crystals.

12. The electro-optic display of claim 1, wherein the layer of electro-optic material is of a thickness in the range of about 10 mils or less.

* * * * *